(12) United States Patent
Waddington et al.

(10) Patent No.: US 12,554,652 B2
(45) Date of Patent: Feb. 17, 2026

(54) VIRTUAL MACHINE FAILOVER WITH DISAGGREGATED SHARED MEMORY

(71) Applicant: International Business Machines Corporation, Armonk, NY (US)

(72) Inventors: Daniel Waddington, Morgan Hill, CA (US); Moshik Hershcovitch, Tel-Aviv (IL)

(73) Assignee: International Business Machines Corporation, Armonk, NY (US)

(*) Notice: Subject to any disclaimer, the term of this patent is extended or adjusted under 35 U.S.C. 154(b) by 750 days.

(21) Appl. No.: 17/932,326

(22) Filed: Sep. 15, 2022

(65) Prior Publication Data
US 2024/0095186 A1    Mar. 21, 2024

(51) Int. Cl.
*G06F 12/121* (2016.01)
*G06F 9/455* (2018.01)

(52) U.S. Cl.
CPC ........ *G06F 12/121* (2013.01); *G06F 9/45558* (2013.01); *G06F 2009/45583* (2013.01); *G06F 2212/1044* (2013.01)

(58) Field of Classification Search
None
See application file for complete search history.

(56) References Cited

U.S. PATENT DOCUMENTS

| | | | |
|---|---|---|---|
| 10,379,967 B2 * | 8/2019 | Wade | G06F 11/1469 |
| 10,838,647 B2 | 11/2020 | Guim Bernat et al. | |
| 10,969,975 B2 | 4/2021 | Bernat et al. | |
| 11,016,798 B2 | 5/2021 | Gopalan | |
| 11,016,908 B2 | 5/2021 | Johns et al. | |
| 11,036,531 B2 | 6/2021 | Connor et al. | |
| 11,200,168 B2 | 12/2021 | Johns et al. | |
| 11,288,194 B2 | 3/2022 | Johns et al. | |
| 11,288,208 B2 | 3/2022 | Nair et al. | |
| 2014/0068197 A1 | 3/2014 | Joshi et al. | |
| 2015/0378770 A1 | 12/2015 | Guthrie et al. | |
| 2016/0210208 A1 | 7/2016 | Chen | |

(Continued)

OTHER PUBLICATIONS

Li et al., ConSnap: Taking Continuous Snapshots for Running State Protection of Virtual Machines, 2014, 2014 20th IEEE International Conference on Parallel and Distributed Systems (ICPADS), pp. 1-8 (Year: 2014).*

(Continued)

*Primary Examiner* — Bradley A Teets
*Assistant Examiner* — Melissa A Headly
(74) *Attorney, Agent, or Firm* — Cantor Colburn LLP; Edward Wixted

(57) ABSTRACT

According to an aspect, a computer-implemented method includes operating a program on a virtual machine on a first device having a local cache memory. Based on a determination that an epoch timer has not expired, aspects include writing one or more updates to the local cache memory and transmitting evicted items from the local cache memory to a shared memory device that is separate from the first device. Based on a determination that an epoch timer has expired, aspects include flushing the local cache memory to the shared memory device, transmitting a virtual CPU state of the virtual machine to the shared memory device, and resetting the epoch timer.

20 Claims, 5 Drawing Sheets

(56) References Cited

U.S. PATENT DOCUMENTS

2020/0371692 A1 11/2020 Van Doorn et al.
2022/0382574 A1* 12/2022 Gopalan ............ G06F 11/0793

OTHER PUBLICATIONS

Anonymous, "Page Modification Logging for Virtual Machine Monitor White Paper," Intel, 331872-001, Jan. 2015, 7 pages.
International Search Report and Written Opinion; Application No. PCT/EP2023/074855; Filed: Sep. 11, 2023; Date of mailing: Dec. 21, 2023; 14 pages.
Anonymously, "A Method to Improve Compute Node Disaster Recovery Efficiency in Large-Scale Cloud Environment.", IP.Com. Mar. 30, 2019. 5 Pages.
Anonymously, "Method and System for Automatically Testing High Availability (HA) Failover Procedure in Virtualization Based Environment." IP.Com, Mar. 10, 2011. 3 Pages.
Anonymously, "Persistent Memory Development Kit." https://pmem.io/pmdk/.Jul. 14, 2022, 7 Pages.
Anonymously, System and Method for In-Memory High Availabilty/Disaster Recovery Solution. IP.Com, Mar. 30, 2019. Jul. 4, 2013. 6 Pages.
Anonymously, Method to Maintain Consistent Data on Recovery Site in Hybrid Cloud Environment. IP.Com, Jan. 23, 2022. 6 Pages.
Basu, A. et al.,"Efficient Virtual Memory for Big Memory Servers." google.com, 2013. 12 Pages.
Calciu, I. et al., "Rethinking Software Runtimes for Disaggregated Memory." ASPLOS '21, Apr. 19-23, 2021, Virtual, USA. Apr. 2021. pp. 1-14.
D. Ustiugov et al., "Benchmarking, Analysis, and Optimization of Serverless Function Snapshots." ASPLOS '21, Apr. 19-23, 2021, Virtual, USA. 14 Pages.
J. Ren et al., "ThyNVM: Enabling Software-Transparent Crash Consistency in Persistent Memory Systems." IEEE Xplore. Jul. 14, 2022, 14 Pages.
J. Zhao et al., "Kiln: Closing the Performance Gap Between Systems With and Without Persistence Support." IEEE Xplore. Jul. 14, 2022. 12 Pages.
K. Doshi et al., "Atomic Persistence for SCM with a Non-intrusive Backend Controller." IEEE Xplore. Jul. 14, 2022, 13 Pages.
K. Tang et al.,"DV-NVLLC: Efficiently guaranteeing crash consistency in persistent memory via dynamic versioning." IEEE Xplore. Jul. 14, 2022, 8 Pages.
Liu, L. et al., "Memory Disaggregation: Research Problems and Opportunities." Google.com, 1999. 10 Pages.
M.Cai et al.,"HOOP: Efficient Hardware-Assisted Out-of-Place Update for Non-Volatile Memory." Google.com, 13 Pages.
V. Kommareddy et al. "Page Migration Support for Disaggregated Non-Volatile Memories." MEMSYS' Sep. 30-Oct 3, 2019, 6 Pages.
VMWare, "vSphere Troubleshooting", google.com. May 2018. 112 Pages.
Zhou, Y. et al., "Fast Cluster Failover Using Virtual Memory-Mapped Communication." ACM International Conference on Supercomputing, 1999. 11 Pages.

* cited by examiner

VIRTUAL MACHINE FAILOVER WITH DISAGGREGATED SHARED MEMORY

BACKGROUND

The present invention generally relates to computer systems, and more specifically, to computer systems, computer-implemented methods, and computer program products for providing virtual machine failover using disaggregated shared memory.

Recently, the use of disaggregated shared memory has become more common. In general, disaggregated shared memory provides compute-memory disaggregation that enables multiple processors to be connected to the same memory resources (e.g., Type 3 Memory Device). In addition, compute-memory disaggregation allows memory devices to be separated from processing devices unlike most architectures today which combine processors and memory within the same physical server unit.

In general, a virtual machine state can be easily moved or copied, also referred to as being snapshot, to storage. The virtual machine (VM) state includes a virtual CPU state (e.g., registers, program counter), memory pages, and storage and network state. In today's systems, the virtual CPU state and memory pages are copied to a remote server where they can be later accessed should a failure occur. In the event of failure, the VM is restarted on the corresponding remote node using the latest copied snapshot of the virtual CPU and memory state. The problem with this approach is that snapshot data must be copied across the network and a restart can only occur on the node that created the snapshot data copy.

SUMMARY

Embodiments of the present invention are directed to a computer-implemented method for providing virtual machine failover using disaggregated shared memory. The method includes operating a program on a virtual machine on a first device having a local cache memory. Based on a determination that an epoch timer has not expired, the method includes writing one or more updates to the local cache memory and transmitting evicted items from the local cache memory to a shared memory device that is separate from the first device. Based on a determination that an epoch timer has expired, the method includes flushing the local cache memory to the shared memory device, transmitting a virtual CPU state of the virtual machine to the shared memory device, and resetting the epoch timer.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
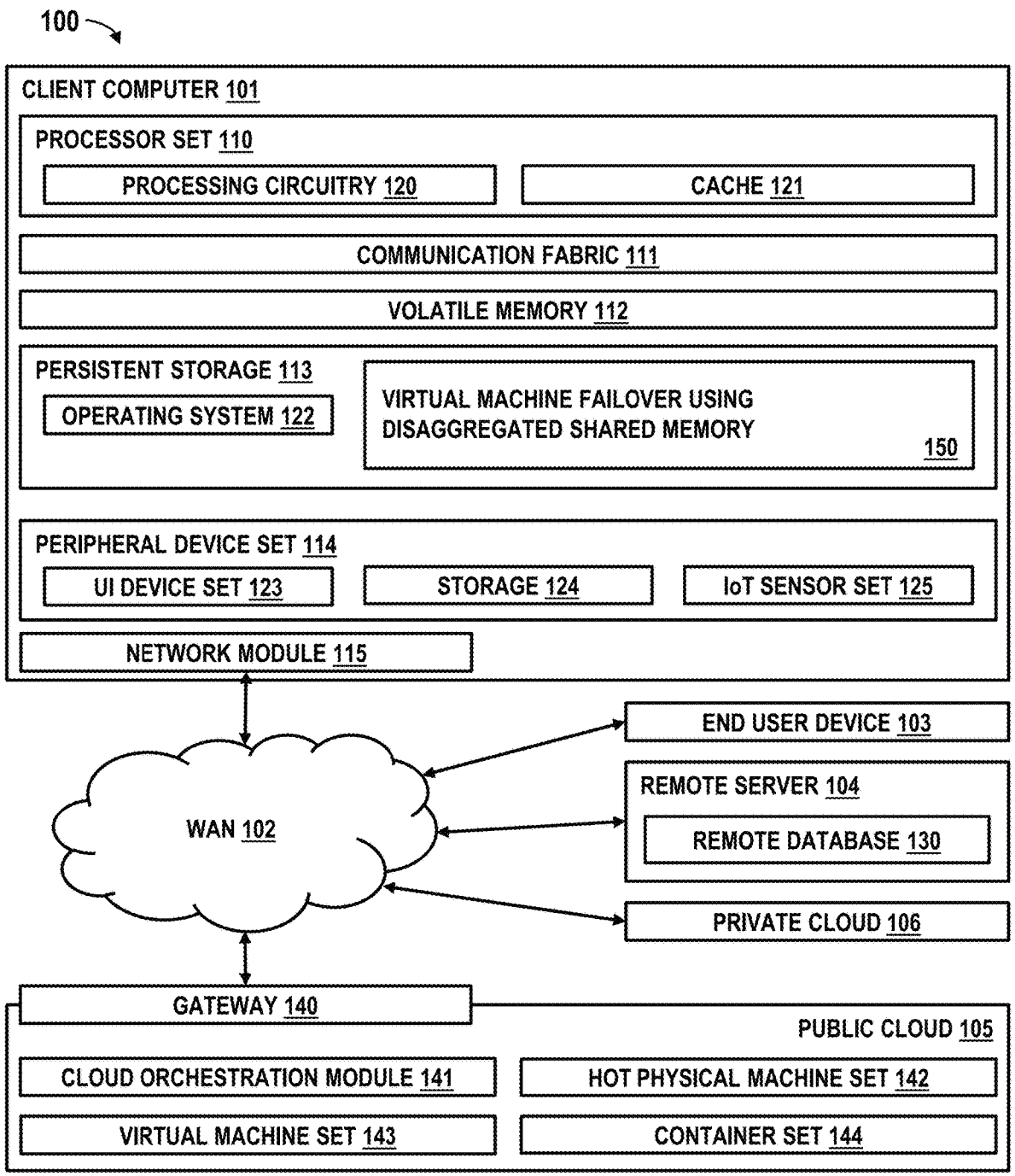
FIG. 1 depicts a block diagram of an example computer system for use in conjunction with one or more embodiments of the present invention.

As discussed above, a VM can only currently be restarted using the latest copied snapshot of the virtual CPU and memory state on the computing system that created the snapshot data copy. This requires any underlying problems in the computing system that caused the failure to be corrected and for the snapshot data to be copied across the network back to the computing system.

One or more embodiments of the present invention overcome these shortcomings by providing methods, systems, and computer program products for virtual machine failover using disaggregated shared memory. In exemplary embodiments, efficient virtual-machine restart is provided by leveraging shared memory in a disaggregated environment and minimizing the volume of data that needs to be copied. In exemplary embodiments, providing virtual machine failover using disaggregated shared memory significantly reduces data copying and movement, as well as reducing recovery time.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as the virtual machine failover using disaggregated shared memory 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In exemplary embodiments, methods, systems, and computer program products for virtual machine failover using disaggregated shared memory are provided. In one embodiment, a virtual machine disposed on a first computing system is configured to store the main program memory in a shared memory device that is separate from the first computing system. When a failure of the first computing device is detected, the virtual machine is restored on a second computing system using the main program memory from the shared memory device.

Figure 2:
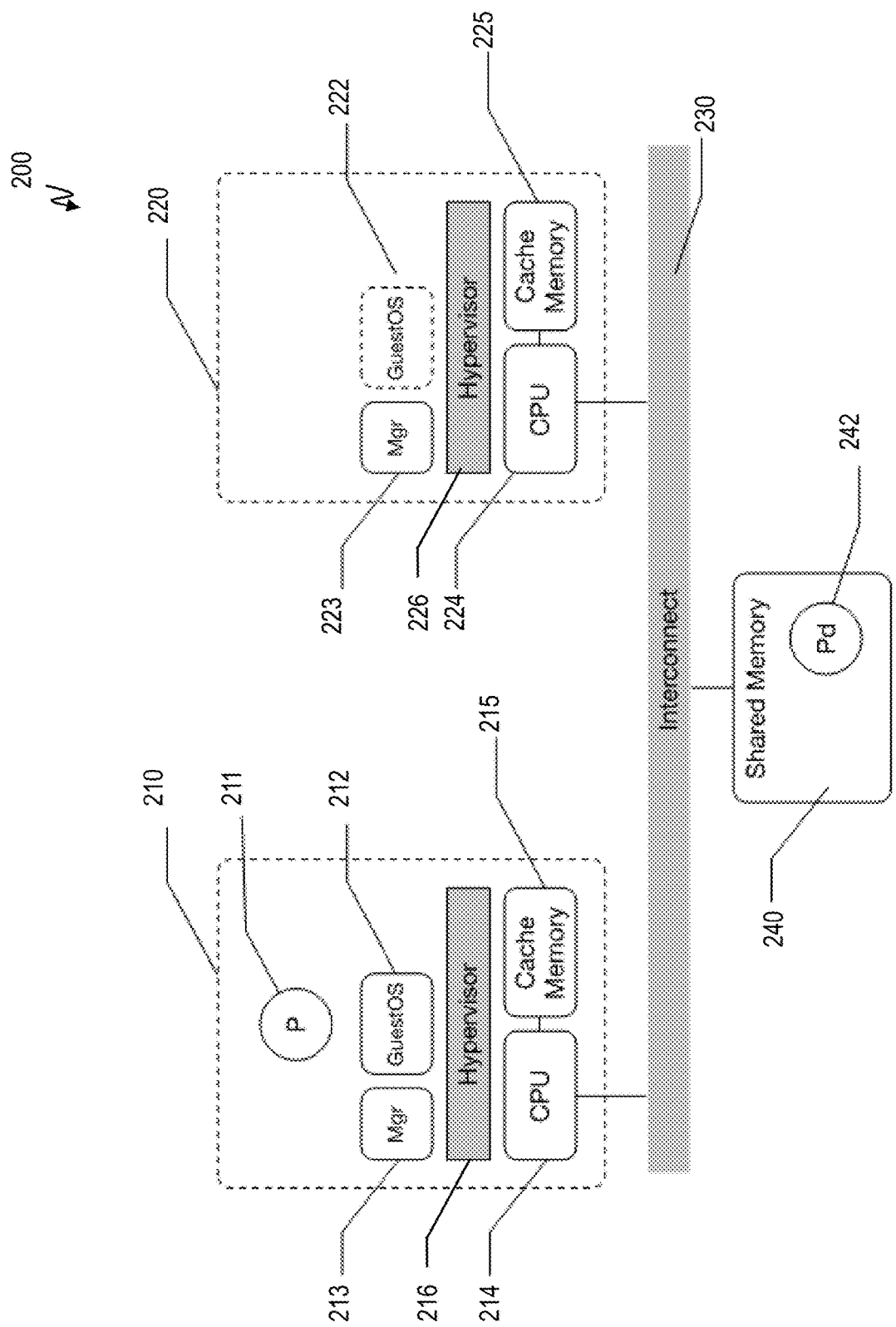
FIG. 2 is a block diagram of a system for providing virtual machine failover using disaggregated shared memory in accordance with one or more embodiments of the present invention.

Referring now to FIG. 2, a block diagram of a system 200 for providing virtual machine failover using disaggregated shared memory is shown. As illustrated, the system 200 includes a first computing system 210, also referred to herein as an active node, and a second computing system 220, also referred to herein as a standby node. The system also includes a shared memory device 240. In exemplary embodiments, one or more of the computing systems 210, 220 and the shared memory device 240 may be embodied in a computer 101 as shown in FIG. 1. The computing system 210 and the second computing system 220 are both configured to communicate with the shared memory device 240 via interconnect 230. In exemplary embodiments, interconnect 230 is a high-speed communications link, such as Peripheral Component Interconnect Express (PCIe).

The first computing system 210 includes a program 211 that is executing on a guest operating system 212 that is running as a virtual machine atop a hypervisor 216. The hypervisor 216 manages resources of the first computing system 210, including the CPU(s) 214 and local cache memory 215 and makes them available to the guest OS 212 as virtualized devices. As used herein, a vCPU refers to a virtualized CPU. The first computing system 210 also includes a manager 213 that is configured to monitor the operation of the guest OS 212 and/or program 211.

Similar to the first computing system 210, the second computing system 220 includes a guest operating system 222 that is running as a virtual machine atop a hypervisor 226. The hypervisor 226 manages resources of the second computing system 221, including the CPU(s) 224 and local cache memory 225 and makes them available to the guest OS 222 as virtualized devices. The second computing system 220 also includes a manager 223 that is configured to monitor the operation of the guest OS 222 and/or program 221.

In exemplary embodiments, the shared memory device 240 is configured to store the main program memory 242 from the program 211. The CPU 214 is connected to a cache coherent-interconnect 230 that allows both CPUs 214 and 224 to access the attached shared memory device 240 directly through load-store instructions. The shared memory device can include volatile and/or non-volatile memory.

The main memory 242 for program 211 which is conventionally held in locally attached DRAM is instead held in the shared memory device 240. However, certain cache lines held in the CPU 214 may not be coherent with the shared memory device 600 and are typically volatile, i.e., are lost in the event of power failure or program reset. Should any element of the active node fail the program 211 is restarted on the standby node by the remote manager 223 where it transparently continues execution from where it left off (with some minimal loss of time and progress). In exemplary embodiments, the failure of an element of the active node is detected by the manager 213. During failover, the standby node attaches, via the interconnect 230, to the shared memory device 240 to gain access to the main memory 242 of the program 211.

In exemplary embodiments, the program 211 writes to the local cache memory 215 and as items get evicted from the local cache memory 215, they are written to the main program memory 242. As is typical in today's hardware architectures, cache lines cannot be forced to stay in the cache and may be evicted and thus written to the shared memory at any time. As a result, at any point in time, the current state of the program 211 may be arbitrarily distributed across the local cache memory 215 and the shared memory device 240. In this case, when a failure occurs the program 211 cannot be restarted on the standby node with consistent data, i.e., at least some part of the data may have been lost in the local cache memory 215.

Figure 3:
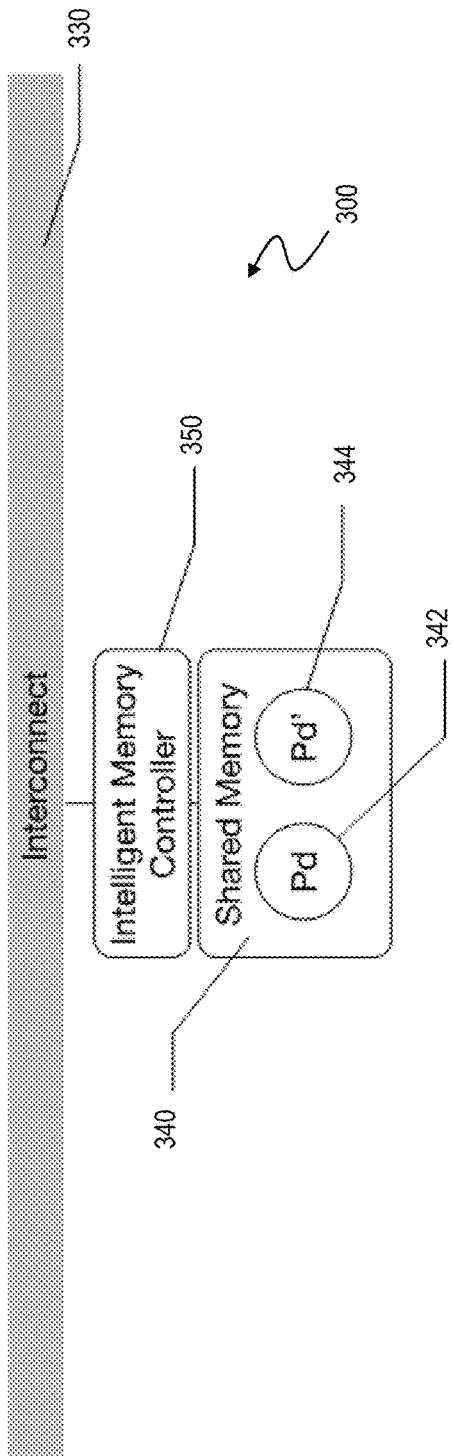
FIG. 3 is a block diagram of a portion of a system for providing virtual machine failover using disaggregated shared memory in accordance with one or more embodiments of the present invention.

FIG. 3 is a block diagram of a portion of a system 300 for providing virtual machine failover using disaggregated shared memory in accordance with one or more embodiments of the present invention is shown. As illustrated, the system 300 includes a shared memory device 340 that is connected to interconnect 330 via a memory controller 350. In exemplary embodiments, the memory controller 350 is configured to transparently provide support for undoing or rolling-back changes to the main program memory 342. These types of memory controllers 350 have been applied to persistent memories to achieve crash-consistency. In one embodiment, the shared memory device 340 stores a main program memory 342 which is used to either rewind or roll forward a state main program memory 344.

In exemplary embodiments, the shared memory device 340 retains the prior version of a designated set of one or more memory regions in the state main program memory 344. The program, or other software, designates the beginning and end of a transaction. During the transaction, updates are made to the main program memory 342 and are logged. At the end of the transaction, the updates to the main program memory 342 are applied to the state main program memory 344 and the log is cleared. In addition, at the end of the transaction, the state of the vCPU is obtained and written to the state main program memory 344.

In exemplary embodiments, although memory is continuously written to the shared memory device, snapshots are still used. In one embodiment, the snapshot boundary (which occurs at the end of some defined epoch or in response to some trigger, e.g., by the application) defines the point in time in which the hypervisor forces the local cache memory to be flushed to the shared memory device. In addition, the hypervisor saves the vCPU state to the shared memory device also at this point in time. Once all vCPU and page state have been committed to shared memory the transaction can be completed and a new transaction started. The effect of the solution is that the coherent state of VM pages and vCPU state can be successfully picked up by the standby node and a new instance of the program can be created on the standby node. In exemplary embodiments, the epoch timer, which determines the frequency of the snapshots is approximately one millisecond or less. As a result, the volume of data to flush is very small.

In exemplary embodiments, both fixed epochs can trigger snapshots (i.e., controlled by the hypervisor) as well as "application-triggered" snapshots whereby the application running in the guest VM can trigger a snapshot according to some application-defined criteria. In one embodiment, the hypervisor is configured to forcefully evict (write-back and invalidate) memory lines from the local cache memory during the snapshot epoch in order to pro-actively reduce the time taken to achieve a quiescent state at the end of the snapshot.

Figure 4:
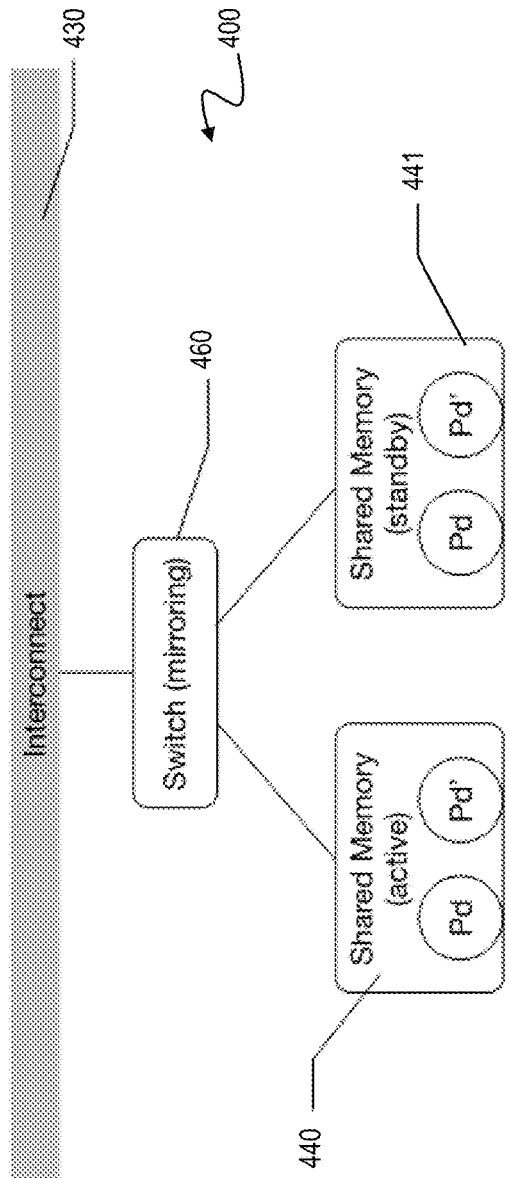
FIG. 4 is a block diagram of a portion of a system for providing virtual machine failover using disaggregated shared memory in accordance with one or more embodiments of the present invention.

FIG. 4 is a block diagram of a portion of a system 400 for providing virtual machine failover using disaggregated shared memory in accordance with one or more embodiments of the present invention is shown. In the illustrated embodiment, the system 400 includes a switch 460 that is configured to connect an active shared memory device 440 and a standby, or backup, shared memory device 441 to the interconnect 430. In exemplary embodiments, one of any known replication schemes can be used to replicate the data stored on the active shared memory device 440 to the backup shared memory device 441. This allows the shared memory device to operate in an active-standby or active-active model to tolerate the failure of a shared memory device. Although not shown, the system 400 may also include a memory controller, such as the one shown in FIG. 3.

Figure 5:
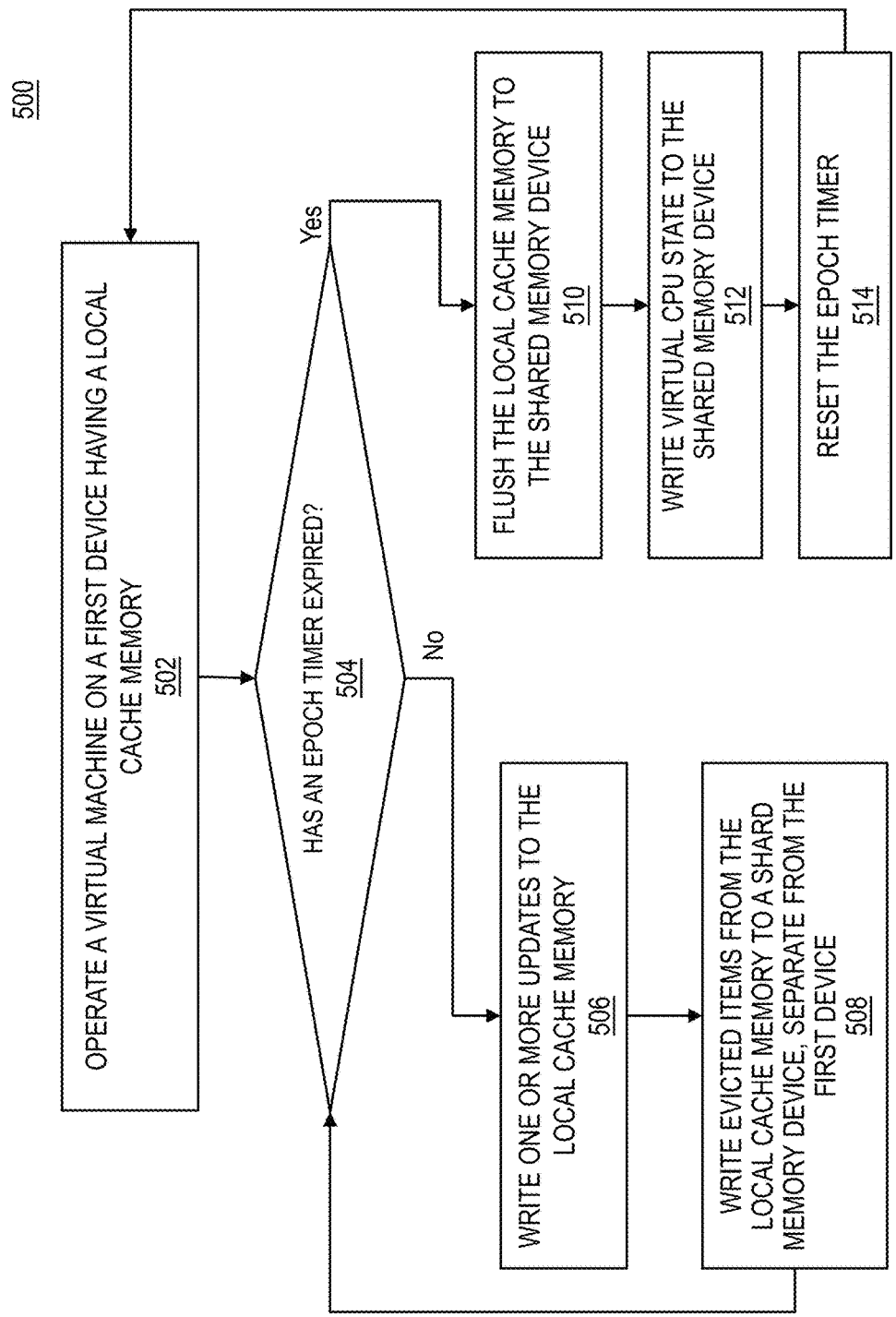
FIG. 5 is a flowchart of a method for operating a virtual machine using disaggregated shared memory in accordance with one or more embodiments of the present invention.

Referring now to FIG. 5, a flowchart of a method 500 for operating a virtual machine using disaggregated shared memory in accordance with one or more embodiments of the present invention is shown. The flowchart is described in reference to FIGS. 1-2 and may include additional steps not depicted in FIG. 5. Although depicted in a particular order, the blocks depicted in FIG. 5 can be rearranged, subdivided, and/or combined. As shown at block 502, the method 500 includes operating a virtual machine on a first device having a local cache memory. Next, as shown at decision block 504, the method 500 includes determining whether an epoch timer has expired. Based on determining that the epoch timer has not expired, the method 500 proceeds to block 506 and writes one or more updates to a local cache memory. Next, as shown at block 508, the method 500 includes writing evicted items from the local cache memory to a shared memory device, which is separate from the first device.

Based on a determination that the epoch timer has expired, the method 500 proceeds to block 510 and flushes the local cache memory to the shared memory device. Next, as shown at block 512, the method 500 includes writing a virtual CPU state to the shared memory device. Once the virtual CPU state has been written to the shared memory device, the method 500 includes updating a log of the shared memory device to commit the transactions to the shared memory device, as shown at block 514. In exemplary embodiments, the shared memory device is configured to update the log corresponding to the main memory for the program based on receiving the virtual CPU state of the virtual machine. The method 500 also includes resetting the epoch timer, as shown at block 516. In exemplary embodiments, when the epoch timer is reset, the first device transmits a transaction begin message to the shared memory device and transmits a transaction end message to the shared memory device after the virtual CPU state has been transmitted.

In exemplary embodiments, the duration of the epoch timer is set by a hypervisor operating on the first device. In one embodiment, the duration of the epoch timer is configurable to allow the hypervisor to balance the risk of data loss with the added cost of increased network traffic.

Figure 6:
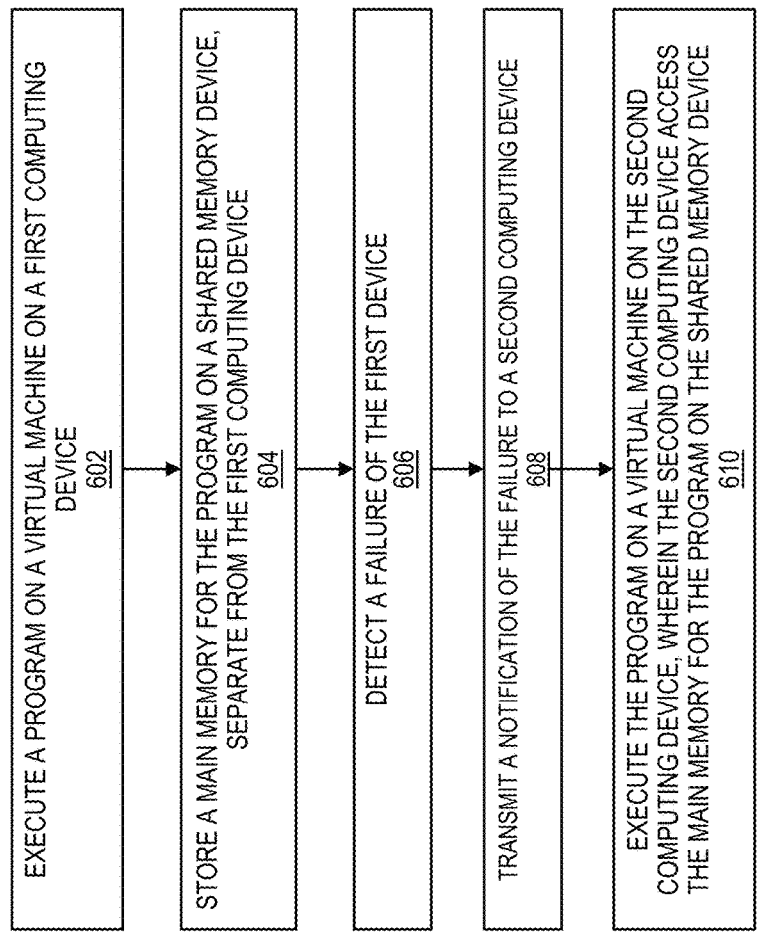
FIG. 6 is a flowchart of a method for virtual machine failover using disaggregated shared memory in accordance with one or more embodiments of the present invention.

Referring now to FIG. 6 a flowchart of a method 600 for virtual machine failover using disaggregated shared memory in accordance with one or more embodiments of the present invention is shown. The flowchart is described in reference to FIGS. 1-2 and may include additional steps not depicted in FIG. 6. Although depicted in a particular order, the blocks depicted in FIG. 6 can be rearranged, subdivided, and/or combined. As shown at block 602, the method 600 includes executing a program on a virtual machine on a first computing device. Next, as shown at block 604, the method 600 includes storing a main memory for the program on a shared memory device, which is separate from the first computing device.

The method 600 also includes detecting a failure of the first device, as shown at block 606. After a failure of the first device is detected, the method 600 proceeds to block 608 and transmits a notification of the failure to a second computing device. Next, as shown at block 610, the method 600 includes rolling back the main memory for the program on the shared memory device to the last good state, i.e., the state at the end of the last epoch timer when the previous virtual CPU state was written to the shared memory device. The method 600 also includes executing the program on a virtual machine on a second computing device, wherein the second computing device access the main memory for the program on the shared memory device, as shown at block 612.

Technical advantages and benefits include providing a failover mechanism for virtual machines using disaggregated shared memory to increase the speed at which a failed virtual machine can be restored and to minimize data loss that occurs during the failover process.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    operating a program on a virtual machine on a first device having a local cache memory, wherein the first device is coupled via a cache-coherent interconnect to a disaggregated shared memory device that is physically separate from the first device, the disaggregated shared memory device storing the entirety of a main memory for the program, and serving as a primary memory for the virtual machine;
    based on a determination that an epoch timer has not expired:
        writing one or more updates to the local cache memory; and
        transmitting, over the cache-coherent interconnect, evicted dirty cache lines from the local cache memory directly to the disaggregated shared memory device;
    based on a determination that an epoch timer has expired:
        flushing all dirty cache lines from the local cache memory, over the cache-coherent interconnect, to the disaggregated shared memory device;
        transmitting a virtual CPU state of the virtual machine to the disaggregated shared memory device; and
        resetting the epoch timer;
    wherein a duration of the epoch timer is reconfigurable by a hypervisor associated with the virtual machine, and wherein the epoch timer determines the frequency of capturing snapshots of the virtual machine.

2. The computer-implemented method of claim 1, wherein a duration of the epoch timer is set by a hypervisor associated with the virtual machine.

3. The computer-implemented method of claim 1, further comprising transmitting a transaction begin message to the disaggregated shared memory device based on the epoch timer being reset.

4. The computer-implemented method of claim 1, further comprising transmitting a transaction end message to the disaggregated shared memory device based on a determination that the epoch timer has expired.

5. The computer-implemented method of claim 1, further comprising:
    detecting a failure of the first device; and
    transmitting a notification of the failure to a second device, wherein the notification causes the program to execute on the second device.

6. The computer-implemented method of claim 5, wherein the second device is configured to access the disaggregated shared memory device.

7. The computer-implemented method of claim 1, wherein the disaggregated shared memory device is configured to store a main memory for the program.

8. The computer-implemented method of claim 1, wherein the disaggregated shared memory device is configured to update a log corresponding to the main memory for the program based on receiving the virtual CPU state of the virtual machine.

9. The computer-implemented method of claim 8, wherein the update to the log marks the previously received updates to the main memory for the program as committed.

10. A system comprising:
a memory having computer readable instructions; and one or more processors for executing the computer readable instructions, the computer readable instructions controlling the one or more processors to perform operations comprising:
operating a program on a virtual machine on a first device having a local cache memory, wherein the first device is coupled via a cache-coherent interconnect to a disaggregated shared memory device that is physically separate from the first device, the disaggregated shared memory device storing the entirety of the main memory for the program, and serving as the primary memory for the virtual machine;
based on a determination that an epoch timer has not expired:
writing one or more updates to the local cache memory; and
transmitting, evicted dirty cache lines from the local cache memory directly to the disaggregated shared memory device;
based on a determination that an epoch timer has expired:
flushing all dirty cache lines from the local cache memory, over the cache coherent interconnect, to the disaggregated shared memory device;
transmitting a virtual CPU state of the virtual machine to the disaggregated shared memory device; and
resetting the epoch timer;
wherein a duration of the epoch timer is reconfigurable by a hypervisor associated with the virtual machine, and wherein the epoch timer determines the frequency of capturing snapshots of the virtual machine.

11. The system of claim 10, wherein a duration of the epoch timer is set by a hypervisor associated with the virtual machine.

12. The system of claim 10, wherein the operations further comprise transmitting a transaction begin message to the disaggregated shared memory device based on the epoch timer being reset.

13. The system of claim 10, wherein the operations further comprise transmitting a transaction end message to the disaggregated shared memory device based on a determination that the epoch timer has expired.

14. The system of claim 10, wherein the operations further comprise:
detecting a failure of the first device; and
transmitting a notification of the failure to a second device, wherein the notification causes the program to execute on the second device.

15. The system of claim 14, wherein the second device is configured to access the disaggregated shared memory device.

16. The system of claim 10, wherein the disaggregated shared memory device is configured to store a main memory for the program.

17. The system of claim 10, wherein the disaggregated shared memory device is configured to update a log corresponding to the main memory for the program based on receiving the virtual CPU state of the virtual machine.

18. The system of claim 17, wherein the update to the log marks the previously received updates to the main memory for the program as committed.

19. A computer program product comprising a computer readable storage medium having program instructions embodied therewith, the program instructions executable by a processor to cause the processor to perform operations comprising:
operating a program on a virtual machine on a first device having a local cache memory, wherein the first device is coupled via a cache-coherent interconnect to a disaggregated shared memory device that is physically separate from the first device, the disaggregated shared memory device storing the entirety of the main memory for the program, and serving as the primary memory for the virtual machine;
based on a determination that an epoch timer has not expired:
writing one or more updates to the local cache memory; and
transmitting, over the cache-coherent interconnect, evicted dirty cache lines from the local cache memory directly to the disaggregated shared memory device that is separate from the first device;
based on a determination that an epoch timer has expired:
flushing all dirty cache lines from the local cache memory, over the cache-coherent interconnect, to the disaggregated shared memory device;
transmitting a virtual CPU state of the virtual machine to the disaggregated shared memory device; and
resetting the epoch timer;
wherein a duration of the epoch timer is reconfigurable by a hypervisor associated with the virtual machine, and wherein the epoch timer determines the frequency of capturing snapshots of the virtual machine.

20. The computer program product of claim 19, wherein a duration of the epoch timer is set by a hypervisor associated with the virtual machine.

* * * * *